May 7, 1935.　　W. R. HARDING　　2,000,699
ARC WELDING GENERATOR
Filed Sept. 29, 1931
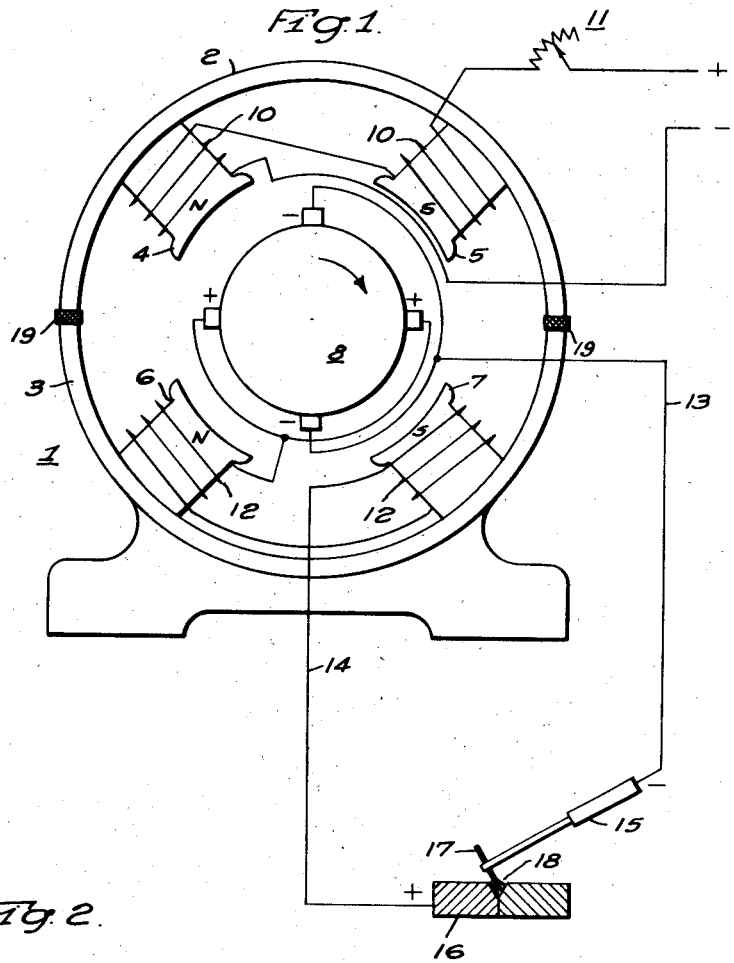
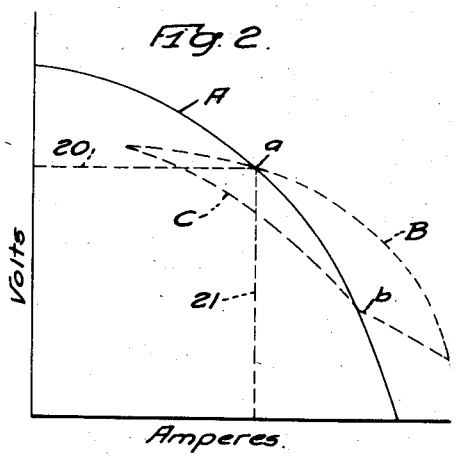
WITNESSES:-
E. A. McCloskey
Robert R. Lockwood
INVENTOR
William R. Harding
BY W. R. Coley
ATTORNEY Patented May 7, 1935

2,000,699

UNITED STATES PATENT OFFICE 2,000,699

ARC WELDING GENERATOR

William R. Harding, Wilkinsburg, Pa., assignor to Westinghouse Electric & Manufacturing Company, a corporation of Pennsylvania Application September 29, 1931, Serial No. 565,743

9 Claims. (Cl. 171—223)

My invention relates generally to electric generators, and it has particular relation to electric generators for use in arc welding.

Heretofore, when it was desired to supply current to a single welding arc, a differential compound generator was used in conjunction with a welding reactor. It will be readily understood that a generator of this type was used in order to obtain the proper volt-ampere characteristics for maintaining the welding arc. It will also be understood that a reactor was used in the welding circuit to retard the changes of the welding current when the arc was lengthened or shortened.

The differential compound generator, that was used for supplying the single welding arc, is of a construction well known in the art. This generator comprises a rotatable armature and a main frame having inwardly projecting poles on which the field windings are positioned. The field windings comprise a main field winding, which may be separately excited, and a differential series field winding through which the welding current flows while the welding operation is being performed.

In the prior art construction, the main field winding was uniformly distributed on each of the field poles and so disposed as to produce alternate north and south poles. The differential series field winding was also uniformly distributed on each of the field poles and so disposed as to produce a magnetic field in each of the poles, on flow of welding current, in a direction opposite to the direction of the magnetic field produced by the main field winding.

This arrangement of field windings produced the proper volt-ampere characteristic, under certain conditions, for maintaining a welding arc, since, with increase in welding current, the generated voltage decreased on account of the differential action of the series field winding. And conversely, when the welding current decreased, the effect of the differential series field winding decreased with the result that the generated voltage increased, thereby tending to maintain the welding current at a value corresponding to the resistance of the welding arc.

It is a well known fact that a welding arc is inherently unstable and that the current and voltage applied thereto may change with extreme rapidity without the rate of change being retarded by the arc itself. If, for any reason, the arc resistance should increase, the welding current begins to decrease instantly. The voltage applied to the arc should also instantly increase to maintain the proper welding current. If the rate of change of the resistance of the arc is sufficiently slow, the decrease in welding current flowing through the series field winding will cause a decrease in the field produced thereby and consequently the magnetic field produced by the main field winding will increase. The voltage applied to the arc by the welding generator will then increase to a value corresponding to the resistance of the arc and it will be maintained at this value, as long as the resistance of the arc remains constant.

However, the resistance of a welding arc usually changes with great rapidity, thereby necessitating correspondingly rapid changes in both the arc voltage supplied by the generator and the welding current. Because of the fact that the series field winding was positioned in close proximity to the main field winding and on a common magnetic circuit, a transformer action resulted between these two windings upon change of current through the series field winding. This transformer action caused the voltage supplied to the arc from the generator to over-shoot its proper value, and an unstable welding arc was produced which was extremely difficult to utilize for performing a satisfactory welding operation.

In order to decrease over-shooting of the voltage applied to the welding arc, in some instances, an inductance has been placed in the welding circuit. It will be readily seen that the inductance tended to reduce the transformer action between the field windings, since it tended to decrease the rate at which the welding current changes. The degree to which the transformer action was reduced depended largely, of course, on the amount of inductance that was placed in the welding circuit.

It is, therefore, an object of my invention to provide an arc welding generator that shall be simple and efficient in operation and readily and economically manufactured and used.

A more specific object of my invention is to provide for supplying current to a welding arc at predetermined voltages, when the resistance of the arc varies.

A further object of my invention is to provide a minimum of mutual induction between the field windings of an electric generator.

Other objects of my invention will, in part, be obvious and, in part, appear hereinafter.

The invention, accordingly, is disclosed in the embodiment hereof shown in the accompanying drawing, and comprises the features of construction, combination of elements and arrangement of parts, which will be exemplified in the construction hereinafter set forth, and the scope of the application of which will be indicated in the appended claims.

For a more complete understanding of the nature and objects of the invention, reference may be had to the following detailed description, taken in connection with the accompanying drawing, in which Figure 1 is a diagrammatic view illustrating an electric generator for use in an arc welding circuit in accordance with this invention, and Fig. 2 shows a number of curves which demonstrate the characteristics possessed by a generator constructed in accordance with this invention, as compared with other types of generators.

Referring now to the drawing, the generator illustrated comprises a main frame, shown generally at 1, having an upper portion 2 and a lower portion 3. A pair of poles 4 and 5 are carried by the upper portion 2 and a second pair of poles 6 and 7 are mounted on the lower portion 3 of the frame 1. A rotatable armature 8 is located within the generator, as shown.

A main field winding 10 is positioned on the poles 4 and 5, being wound to provide the proper polarities, and may be separately excited from any suitable source of direct current. In order to provide for adjusting the exciting current flowing through the main field winding 10, a rheostat 11 is connected in the circuit therefor as illustrated.

In order to obtain the desired volt-ampere characteristics for performing a welding operation, a series field winding 12 is positioned on the lower poles 6 and 7 to produce the polarity at the pole tips that is indicated on the drawing, when the welding current flows therethrough.

The field winding 12 is connected in series circuit relation with the armature 8, as is the customary practice. It will be noted that one terminal of the armature 8 is connected to a conductor 13 which forms a part of a welding circuit, while one terminal of the series field winding is connected to a conductor 14 which also forms a part of the welding circuit. The conductors 13 and 14 are respectively connected to an electrode holder 15 and work 16 on which a welding operation is to be performed. An electrode 17 of any suitable material is clamped in the electrode holder 15 for conducting the current to maintain an arc 18 between it and the work 16.

With a view to minimizing the magnetic leakage between the upper portion 2 of the main frame 1 and the lower portion 3, any suitable spacers 19, of a non-magnetic material such as copper, may be positioned between the upper and lower portions, as shown.

In order to explain the operation of the generator, reference will be had to the curves shown in Fig. 2 which illustrate the performance of a generator when its differential series field winding is positioned on the same magnetic circuit as the main field winding, and in inductive relation therewith as compared with the operation of a generator constructed in accordance with this invention, having its field windings 10 and 12 in non-inductive relation. The curves were plotted with armature amperes as abscissæ and generator terminal volts as ordinates.

In a welding system employing a differentially compounded generator, it is desirable to supply voltage and current to the welding arc 18, the relation of which is shown by curve A. It is also desirable to have the voltage and current change in accordance with the relation shown by this curve when the resistance of the welding arc changes.

It will be assumed, for purposes of comparison, that a differential generator is used for supplying current to a welding arc which has its main and series field windings positioned on common poles and in inductive relation with each other; it will also be assumed that the system is operating at the point "a" on the curve A with a welding current indicated by the abscissa 20 and a voltage indicated by the ordinate 21.

If, for any reason, the resistance of the arc 18 decreases to such a value that the volt-ampere relation under the new conditions is indicated by the point "b" on the curve A, the change in current and voltage from point "a" to point "b" should be along the curve A between these points. This, however, will not be the case, and the volt-ampere relation during the change from point "a" to point "b" will be along the curve B, which will cause the arc to become unstable, and uncertain welding conditions will result.

From a consideration of the flux changes in the field poles of a generator of this type, it will be readily apparent to one skilled in the art that the transformer action between the field windings causes the volt-ampere curve to take the shape illustrated by curve B rather than the desired shape of the portion of the curve A between the operating points "a" and "b".

In a like manner, it will be noted, when the resistance of the arc 18 increases to its original value, that the volt-ampere characteristic of the generator is shown by the curve C with the attendant disadvantage that the arc may be extinguished because of the diminution of welding current beyond a value sufficient to maintain the arc path properly ionized.

Therefore, in my invention, in order to provide a generator which will supply power to a welding arc without the attendant disadvantage of having the current and voltage over-shoot their proper relative values when the arc resistance changes, the series field winding 12 has been positioned on a magnetic circuit which is separate and distinct from the circuit on which the main field winding 10 is located. When the current changes in the series field winding of a generator constructed in accordance with this invention, there will be practically no interflux linkages between the series field winding and the main field winding. There will, then, be no voltage induced in the main field winding 10 which would cause the voltage generated in the armature 8 to over-shoot tis proper value which corresponds to the arc resistance at the instant. As a result, the volt-ampere characteristic of my machine closely follows the ideal curve A as the arc resistance changes.

Since certain changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. In an electric generator for supplying current to an arc welding circuit, in combination, a main field winding and a differential series field winding, and means for magnetically insulating said windings from each other, said series field winding thereby being disposed to produce substantially no effect on the main field winding when the current in the series field winding is changed.

2. A generator comprising, in combination, a rotatable armature, a main frame, a plurality of inwardly projecting poles carried by the main frame, a main field winding and a differential series field winding disposed on different poles, and means for magnetically insulating from each other the portions of said frame associated with said windings.

3. In an arc welding generator, in combination, a plurality of pairs of oppositely disposed field poles of opposite polarity, a main field winding for applying a constant excitation to one pair of adjacent poles and a series field winding for applying a variable excitation to the remaining pair of poles.

4. In an arc welding generator, in combination, a plurality of pairs of oppositely disposed field poles of opposite polarity, a main field winding for applying a constant excitation to part of the poles, a series field winding for applying a variable excitation to the remainder of the poles, and means for magnetically insulating the poles excited by the main field winding from the poles excited by the series field winding.

5. An electric generator comprising, in combination, a rotatable armature, a main frame, a plurality of inwardly projecting poles carried by the main frame, a main field winding mounted on adjacent poles and a differential series field winding mounted on adjacent poles separate from the poles on which the main field winding is mounted.

6. An arc welding generator comprising, in combination, a rotatable armature, a main frame, a plurality of inwardly projecting poles carried by the main frame, a separately excited field winding, a differential series field winding disposed on different poles, and means for magnetically insulating said windings from each other, said series field winding thereby being disposed to produce substantially no effect on the separately excited field winding on change of current therethrough.

7. In an electric generator for supplying current to a welding circuit, in combination, a rotatable armature having conductors positioned thereon, a main field winding for producing a voltage in a predetermined direction in the conductors, a second field winding for producing a voltage in the conductors in accordance with the welding current in a direction opposite to the direction of the voltage produced by the main field winding, and means for magnetically insulating said field windings from each other.

8. An electric generator for supplying current to an arc welding circuit comprising, in combination, a rotatable armature having conductors positioned thereon, a main frame, a plurality of pairs of oppositely disposed field poles of opposite polarity carried by the main frame, a main field winding disposed on adjacent poles for producing a voltage in a predetermined direction in the conductors, a series field winding disposed on adjacent poles for producing a voltage in the opposite direction in the conductors and means for insulating from each other the portions of said frame associated with said windings.

9. An electric generator for use in arc welding comprising, in combination, a rotatable armature, a main frame, said main frame having upper and lower portions magnetically insulated from each other, a pair of poles carried by the upper portion of the frame, a main field winding disposed on said poles, a second pair of poles mounted on the lower portion of the frame, and a series field winding disposed on said second pair of poles, said series field winding being disposed to produce a differential magnetic field with respect to the magnetic field produced by the main field winding.

WILLIAM R. HARDING.